(12) United States Patent
Wright

(10) Patent No.: US 9,735,974 B2
(45) Date of Patent: Aug. 15, 2017

(54) MESSAGE PROCESSING

(71) Applicant: METASWITCH NETWORKS LTD, Enfield, Middlesex (GB)

(72) Inventor: Benjamin Thomas Wright, London (GB)

(73) Assignee: METASWITCH NETWORKS LTD, Enfield (GB)

( * ) Notice: Subject to any disclaimer, the term of this patent is extended or adjusted under 35 U.S.C. 154(b) by 69 days.

(21) Appl. No.: 14/838,969

(22) Filed: Aug. 28, 2015

(65) Prior Publication Data

US 2016/0065380 A1 Mar. 3, 2016

(30) Foreign Application Priority Data

Aug. 29, 2014 (GB) .................................. 1415378.7

(51) Int. Cl.
G06F 9/45 (2006.01)
H04L 12/18 (2006.01)
G06F 9/455 (2006.01)

(52) U.S. Cl.
CPC ........ H04L 12/185 (2013.01); G06F 9/45558 (2013.01); G06F 2009/45595 (2013.01)

(58) Field of Classification Search
None
See application file for complete search history.

(56) References Cited

U.S. PATENT DOCUMENTS

| 2011/0149960 | A1 | 6/2011 | Gutierrez |
| 2012/0014309 | A1 | 1/2012 | Iizuka et al. |
| 2013/0215891 | A1* | 8/2013 | Perreault ................. H04L 45/52 370/390 |
| 2013/0322443 | A1 | 12/2013 | Dunbar et al. |
| 2014/0098815 | A1* | 4/2014 | Mishra .................. H04L 45/021 370/390 |

(Continued)

OTHER PUBLICATIONS

Metaswitch Networks, "What is multicast IP routing?", [online], Jan. 2014. Available from http://www.metaswitch.com/wiki/what-multicast-ip-routing, accessed Feb. 5, 2015.

(Continued)

*Primary Examiner* — Brandon Renner
(74) *Attorney, Agent, or Firm* — EIP US LLP

(57) ABSTRACT

Measures, including methods, systems and non-transitory computer-readable storage mediums, for use in processing multicast group membership discovery protocol messages in a data center network including a plurality of compute servers. Each compute server in the plurality is capable of running one or more virtual machines. At a multicast group membership discovery protocol proxy located on a compute server in the plurality, a multicast group membership discovery protocol report message is received requesting delivery of data associated with a specified multicast group from a specified multicast data source. It is determined whether the specified multicast data source is hosted by a virtual machine running on the compute server. In response to a positive determination, a request corresponding to the received multicast group membership discovery protocol report message is forwarded to the virtual machine hosting the specified multicast data source on the compute server.

17 Claims, 2 Drawing Sheets

(56) References Cited

U.S. PATENT DOCUMENTS

2014/0223435 A1* 8/2014 Chang ................. G06F 9/45533
　　　　　　　　　　　　　　　　　　　　　　　　　　718/1
2014/0369352 A1* 12/2014 Zhou ...................... H04L 45/16
　　　　　　　　　　　　　　　　　　　　　　　　　　370/390

OTHER PUBLICATIONS

Search Report dated Feb. 17, 2015 for Application No. GB1415378.7.

* cited by examiner

MESSAGE PROCESSING

CROSS-REFERENCE TO RELATED APPLICATIONS

This application claims priority under 35 U.S.C. §119(a) to UK Patent Application No. GB 1415378.7, filed on Aug. 29, 2014, the entire content of which is hereby incorporated by reference.

BACKGROUND OF THE INVENTION

Field of the Invention

The present disclosure relates to message processing. In particular, but not exclusively, the present disclosure relates to processing multicast group membership discovery protocol messages in a data center network.

Description of the Related Technology

Multicast group membership discovery protocols such as the internet group management protocol (IGMP) or the multicast listener discovery (MLD) protocol are designed for internet protocol (IP) networks where potentially there are a large number of subscribers on the same local area network (LAN). IGMP for example assumes that the network in which it is deployed has a tree topology with end receivers at the bottom of the tree and a multicast data source at the top of the tree. On a given LAN, each IGMP-speaker (i.e. an entity which understands the IGMP) is either a router or a host or both. An IGMP host multicast requests for data by sending an IGMP Report onto the LAN. Such a Report can be thought of a request in the form of "please send me data from source S2 to group G2" for example.

All IGMP routers in the LAN receive such requests and the routers elect which router is designated to forward traffic onto the LAN from amongst themselves. The underlying assumption is that any router can receive any data from upstream. A router can then act as a Proxy to forward Reports upstream (or to request data from an upstream node using some other means).

Some networks do not have a tree topology and not all IGMP routers are guaranteed to be able to receive traffic from an upstream source. In these cases, IGMP will not always operate correctly. Such issues can arise in relation to IGMP and internet protocol version 4 (IPv4) and also in relation to MLD and internet protocol version 6 (IPv6). It would therefore be desirable to provide improved measures for processing multicast group membership discovery protocol messages, including in networks which do not have tree (or tree-like) topologies.

SUMMARY

According to first embodiments, there is a method of processing multicast group membership discovery protocol messages in a data center network comprising a plurality of compute servers, each compute server in the plurality being capable of running one or more virtual machines, the method comprising, at a multicast group membership discovery protocol proxy located on a compute server in the plurality:
  receiving a multicast group membership discovery protocol report message requesting delivery of data associated with a specified multicast group from a specified multicast data source;
  determining whether the specified multicast data source is hosted by a virtual machine running on the compute server; and
  in response to a positive determination, forwarding a request corresponding to the received multicast group membership discovery protocol report message to the virtual machine hosting the specified multicast data source on the compute server.

According to second embodiments, there is a system for use in processing multicast group membership discovery protocol messages in a data center network comprising a plurality of compute servers, each compute server in the plurality being capable of running one or more virtual machines, the system comprising at least one memory including computer program code; and
  at least one processor in data communication with the at least one memory, wherein the at least one processor is configured to, at a multicast group membership discovery protocol proxy located on a compute server in the plurality:
  receive a multicast group membership discovery protocol report message requesting delivery of data associated with a specified multicast group from a specified multicast data source;
  determine whether the specified multicast data source is hosted by a virtual machine running on the compute server; and
  in response to a positive determination, forward a request corresponding to the received multicast group membership discovery protocol report message to the virtual machine hosting the specified multicast data source on the compute server.

According to third embodiments, there is a non-transitory computer-readable storage medium comprising computer-executable instructions which, when executed by a processor, cause a computing device to perform a method of processing multicast group membership discovery protocol messages in a data center network comprising a plurality of compute servers, each compute server in the plurality being capable of running one or more virtual machines, the method comprising, at a multicast group membership discovery protocol proxy located on a compute server in the plurality:
  receiving a multicast group membership discovery protocol report message requesting delivery of data associated with a specified multicast group from a specified multicast data source;
  determining whether the specified multicast data source is hosted by a virtual machine running on the compute server; and
  in response to a positive determination, forwarding a request corresponding to the received multicast group membership discovery protocol report message to the virtual machine hosting the specified multicast data source on the compute server.

According to fourth embodiments, there is a method of processing multicast group membership discovery protocol messages in an IP network comprising a plurality of servers, each server in the plurality being capable of hosting one or more multicast data sources, the method comprising, at a multicast group membership discovery protocol proxy located on a server in the plurality:
  receiving a multicast group membership discovery protocol report message requesting delivery of data associated with a specified multicast group from a specified multicast data source, wherein the network comprises a single IP path to/from the specified multicast data source;
  determining whether the specified multicast data source is hosted by the server; and in response to a positive determination, forwarding a request corresponding to the received multicast group membership discovery protocol report message to the specified multicast data source on the server.

Further features of embodiments will become apparent from the following description of preferred embodiments, given by way of example only, which is made with reference to the accompanying drawings.

DETAILED DESCRIPTION OF CERTAIN INVENTIVE EMBODIMENTS

Embodiments described below are primarily described in relation to multicast group membership discovery protocols; such protocols may for example comprise the IGMP (and thus be associated with IPv4) or the MLD protocol (and thus be associated with IPv6). In embodiments where an entity is described as being a multicast group membership discovery protocol entity, for example a multicast group membership discovery protocol host, a multicast group membership discovery protocol proxy, a multicast group membership discovery protocol router, etc., in embodiments relating to the IGMP, such entities may comprise corresponding IGMP entities, for example IGMP hosts, IGMP proxies, IGMP routers, etc., or in embodiments relating to the MLD protocol, such entities may comprise corresponding MLD protocol entities, for example MLD protocol hosts, MLD protocol proxies, MLD protocol routers, etc. Similarly, any messages associated with a multicast group membership discovery protocol can for example comprise messages associated with the IGMP or the MLD protocol, such as IGMP or MLD protocol report messages or suchlike.

Figure 1:
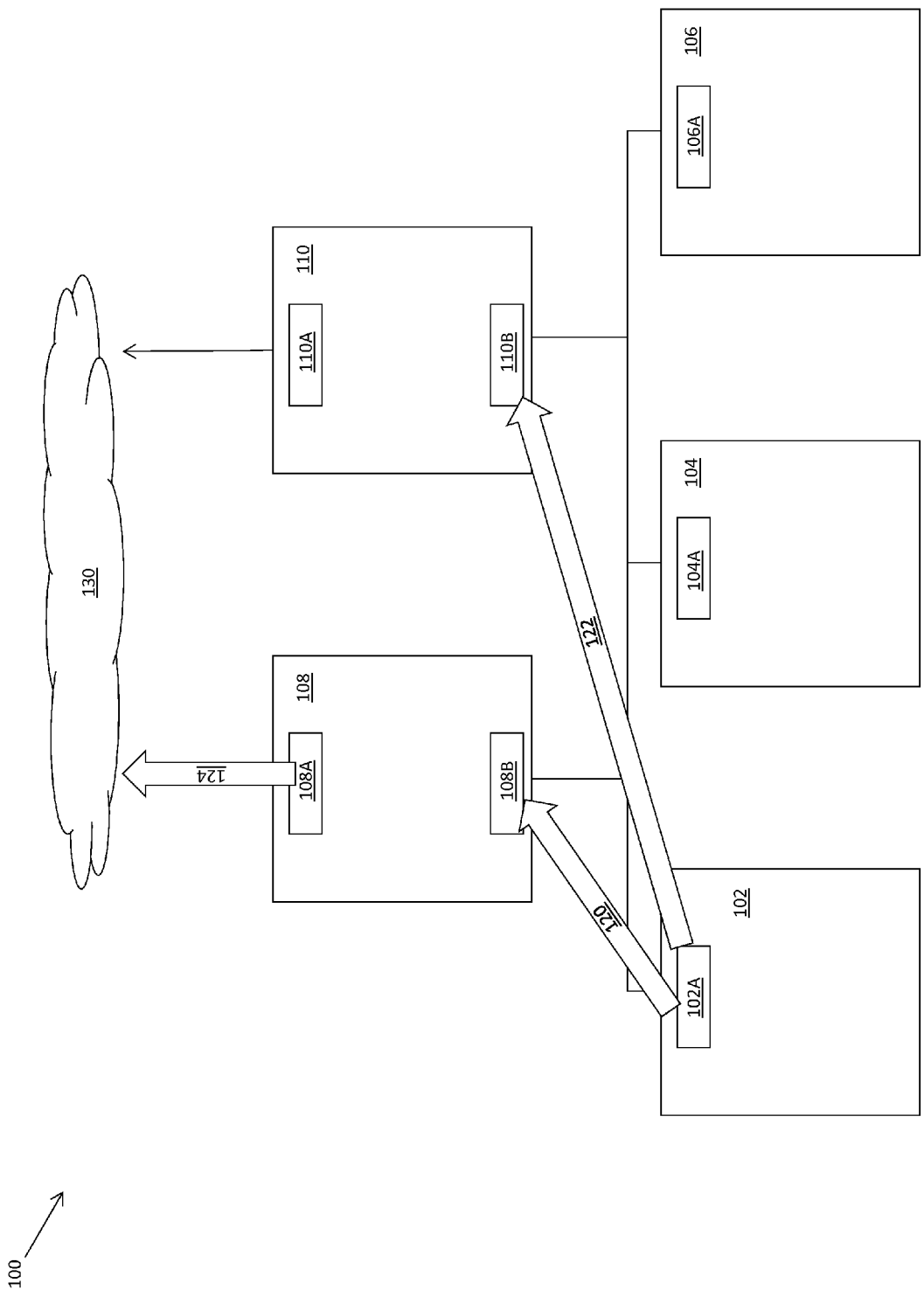
FIG. 1 shows a network according to the prior art.

FIG. 1 shows a network 100 according to the prior art. Network 100 comprises a LAN having a tree topology with one or more multicast data sources at the top as indicated by element 130 and two or more (in this example three, but in practice could have more than this) endpoint receivers 102, 104, 106 at the bottom. Each endpoint receiver 102, 104, 106 comprises a respective multicast group membership discovery protocol host 102A, 104A, 106A.

Network 100 also comprises several (in this example two, but in practice could have more than this) multicast group membership discovery protocol proxies 108, 110 located above endpoint receivers 102, 104, 106 in the tree topology. Each multicast group membership discovery protocol proxy 108, 110 comprises a multicast group membership discovery protocol host 108A, 110A and a multicast group membership discovery protocol router 108B, 110B respectively.

In the example embodiments of FIG. 1, multicast group membership discovery protocol host 102A on endpoint receiver 102 generates a multicast group membership discovery protocol report message requesting that it receives data associated with a specified multicast group (G) from a specified multicast data source (S), for example a request of the form Include(S, G), and transmits the multicast group membership discovery protocol report message into network 100. One copy of the multicast group membership discovery protocol report message is transmitted 120 to multicast group membership discovery protocol proxy 108 and another copy of the message is transmitted 122 to multicast group membership discovery protocol proxy 110. An election process takes place between multicast group membership discovery protocol router 108B on multicast group membership discovery protocol proxy 108 and multicast group membership discovery protocol router 110B on multicast group membership discovery protocol proxy 110. In this example, multicast group membership discovery protocol router 108B on multicast group membership discovery protocol proxy 108 wins the election (for example because it has a lower IP address than multicast group membership discovery protocol router 110B on multicast group membership discovery protocol proxy 110) and is thus designated to forward traffic onto the LAN in relation to multicast group G and the multicast data source S. Multicast group membership discovery protocol router 108B thus proxies the multicast group membership discovery protocol upstream towards the multicast data source as shown by element 124.

Some data networks do not have tree topologies. For example, data center networks typically have a more hub-and-spoke-like topology, where the hub is formed of a bridged LAN or collection of bridged LANs. Such networks do not contain redundant IP paths towards a given multicast data source or rendezvous point (RP). In such scenarios, multicast group membership discovery protocols such as IGMP as-specified break down, for example a given multicast group membership discovery protocol router may be elected to forward data onto the network but may not necessarily have upstream access to every data source.

Figure 2:
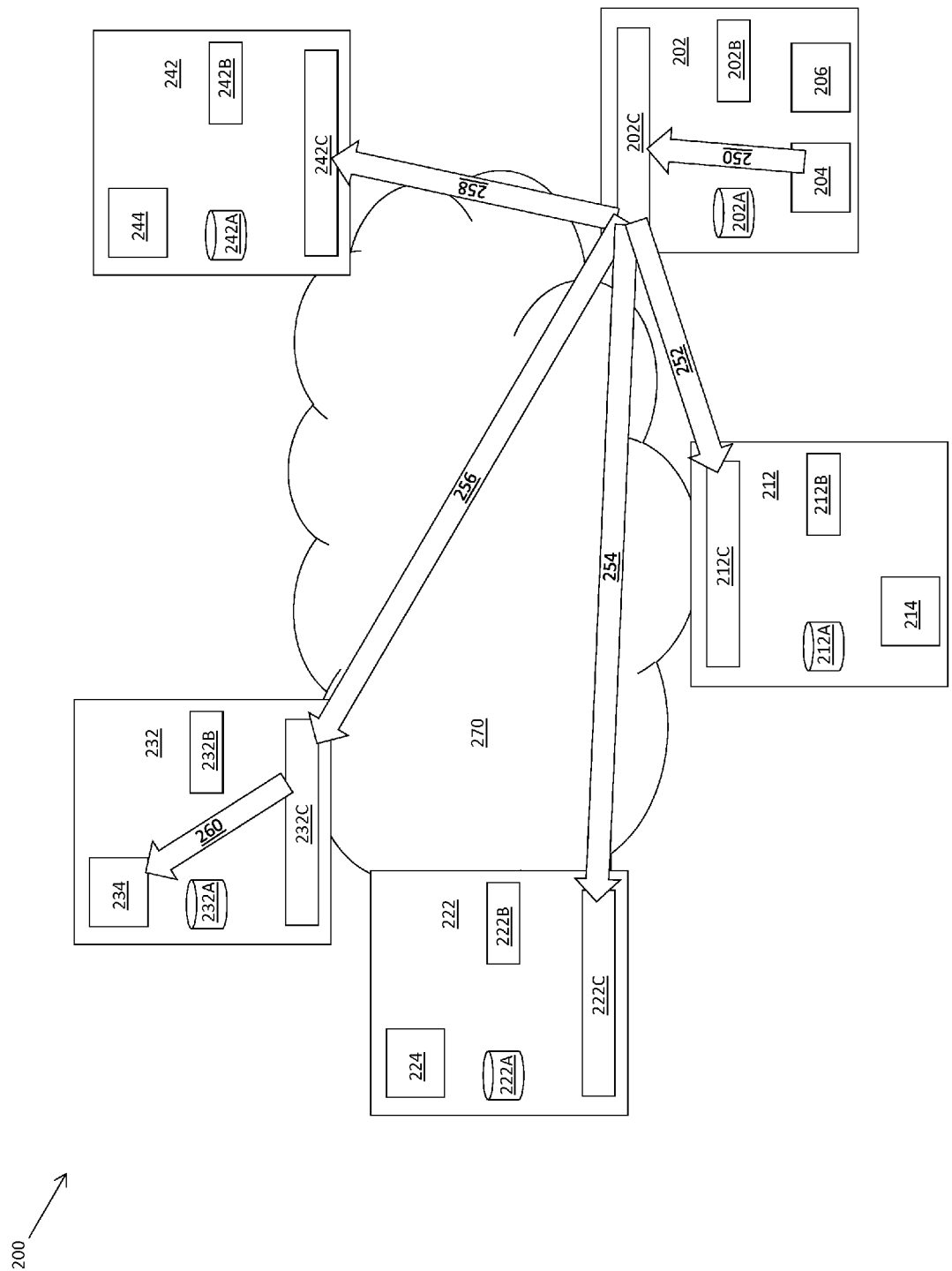
FIG. 2 shows a network according to one or more embodiments of the present disclosure.

FIG. 2 shows a network 200 according to embodiments of the present disclosure. The example network depicted in FIG. 2 comprises a data center network 200.

Data center network 200 has a data center fabric 270 which comprises a plurality of interconnected nodes such as computer servers 202, 212, 222, 232, 242. Each compute server in the plurality is capable of running one or more virtual machines (or 'VMs'). Each virtual machine is capable of hosting one or more applications, for example endpoint receiver applications, multicast data source applications, multicast group membership discovery protocol proxy applications, etc.

Compute servers 202, 212, 222, 232, 242 each have located thereon respective memories 202A, 212A, 222A, 232A, 242A for providing memory storage, processors (or processing systems) 202B, 212B, 222B, 232B, 242B for performing various data processing tasks and multicast group membership discovery protocol proxies 202C, 212C, 222C, 232C, 242C for providing multicast group membership discovery protocol proxy (for example host and/or router) functionality according to embodiments.

Compute server 202 comprises receiver applications 204 and 206 running on respective virtual machines hosted by compute server 202, compute server 212 comprises receiver application 214 running on a virtual machine hosted by compute server 212, and compute server 242 comprises receiver application 244 running on a virtual machine hosted by compute server 242. Compute server 222 comprises a virtual machine 224 running a multicast data source application associated with a multicast group, in this example of the form (source S1, group G1), whereas compute server 232 comprises a virtual machine 234 running a different multicast data source application associated with a different multicast group, in this example of the form (source S2, group G2).

Embodiments comprise extending multicast group membership discovery protocol router behavior such that multicast group membership discovery protocols, such as the IGMP and the MLD protocol, can be used in non-tree topologies (for example, any topology where there are not multiple redundant IP paths towards a given multicast data source).

Embodiments comprise measures, including methods, apparatus and computer programs, for processing multicast group membership discovery protocol messages in a data center network 200 comprising a plurality of compute servers 202, 212, 222, 232, 242. Each compute server in the plurality is capable of running one or more virtual machines.

A receiver application 204 located on a virtual machine hosted by computer server 202 generates a multicast group membership discovery protocol report message requesting delivery of data associated with a specified multicast group G2 from a specified multicast data source S2 and transmits the generated multicast group membership discovery protocol report message to multicast group membership discovery protocol proxy 202C as depicted by arrow 250. The multicast group membership discovery protocol report message requesting delivery of data associated with specified multicast group G2 from specified multicast data source S2 is received by multicast group membership discovery protocol proxy 202C located on compute server 202 which sends the multicast group membership discovery protocol report message to a link local multicast address which provides copies of the multicast group membership discovery protocol report message to multicast group membership discovery protocol proxies 212C, 222C, 232C, 242C located on compute servers 212, 222, 232, 242 respectively as depicted by arrows 252, 254, 256, 258.

Upon receipt of a copy of the multicast group membership discovery protocol report message, multicast group membership discovery protocol proxy 232C determines whether specified multicast data source S2 is hosted by a virtual machine running on compute server 232. In this case, specified multicast data source S2 is hosted by virtual machine 234 running on compute server 232, i.e. the determination is positive.

In response to a positive determination, multicast group membership discovery protocol proxy 232C forwards a request corresponding to the received multicast group membership discovery protocol report message to virtual machine 234 hosting the specified multicast data source S2 on compute server 232 as depicted by arrow 260. In embodiments, the request is forwarded along a logical interface (for example a tap interface) connecting compute server 232 to virtual machine 234 hosting specified multicast data source S2.

In embodiments, the multicast group membership discovery protocol comprises one or more of the IGMP and the MLD protocol.

In embodiments, the multicast group membership discovery protocol proxy comprises one or more of an IGMP proxy and a MLD protocol proxy.

In embodiments, the multicast group membership discovery protocol report message comprises one or more of an IGMP report message and a MLD protocol report message.

Embodiments comprise, in response to the positive determination, multicast group membership discovery protocol proxy 232C designating multicast group membership discovery protocol proxy 232C (i.e. itself) to provide a data forwarding role in the data center network in relation to specified multicast data source S2 and specified multicast group G2.

Embodiments comprise multicast group membership discovery protocol proxy 232C, in response to the positive determination, receiving multicast data from specified multicast data source S2, and forwarding the received multicast data over data center network 200 towards receiver application 204 comprised in specified multicast group G2.

As mentioned above, in addition to providing a copy of the multicast group membership discovery protocol report message to multicast group membership discovery protocol proxy 232C, network fabric 270 also provides copies of the multicast group membership discovery protocol report message to multicast group membership discovery protocol proxies 212C, 222C, and 242C located on compute servers 212, 222, and 242 respectively as depicted by arrows 252, 254, 258.

Upon receipt of a copy of the multicast group membership discovery protocol report message, multicast group membership discovery protocol proxy 222C determines whether specified multicast data source S2 is hosted by a virtual machine running on compute server 222. In this case, specified multicast data source S2 is not hosted by virtual machine 224 (or any other virtual machines that may be) running on compute server 222, i.e. the determination is negative. In embodiments, in response to the negative determination, multicast group membership discovery protocol proxy 222C takes no forwarding action with respect to the received multicast group membership discovery protocol report message.

In some embodiments, in response to the negative determination, multicast group membership discovery protocol proxy 222C maintains state data associated with the received multicast group membership discovery protocol report message. The maintained state data may for example comprise data associated with which multicast group membership discovery protocol reports multicast group membership discovery protocol proxy 222C has received. This maintained state data allows multicast group membership discovery protocol proxy 222C to keep itself informed that at least one receiver application is interested in the S2, G2 multicast data stream. This may for example be of use at some later stage if/when multicast group membership discovery protocol proxy 222C finds itself in a position where it can supply data for multicast stream S2, G2, for example due to multicast group membership discovery protocol proxy 222C subsequently hosting source S2 due to a change in network topology or suchlike.

Upon receipt of copies of the multicast group membership discovery protocol report message, multicast group membership discovery protocol proxies 212C and 242C on respective computer servers 212 and 242 make similar negative determinations and also take no forwarding action with respect to the received multicast group membership discovery protocol report message.

In the embodiments described above, receiver application 204 is located on a different compute server 202 in the plurality to the compute server 232 running virtual machine 234 which hosts specified multicast data source S2.

In embodiments described above, the multicast group membership discovery protocol report message received by multicast group membership discovery protocol proxy 202C requests delivery of data associated with specified multicast group G2 from specified multicast data source S2 to receiver application 204 located on compute server 202.

In alternative embodiments, the received multicast group membership discovery protocol report message requests delivery of data associated with the specified multicast group from the specified multicast data source to a virtual machine configured to act as an RP for that multicast group in data center network 200. Embodiments therefore allow incorporation of RPs into networks where multicast group membership discovery protocols such as the IGMP are employed.

In embodiments, specified multicast data source S2 is not hosted by any other virtual machines running on any other compute servers in the plurality other than virtual machine 234 running on compute server 232.

In embodiments, data center network 200 comprises a single IP path to/from specified multicast data source S2, in this case the single IP path is comprised in compute server 232.

In embodiments, multicast group membership discovery protocol proxy 232C is the only multicast group membership discovery protocol proxy (directly) connected to specified multicast data source S2 in the data center network.

In known systems, multicast group membership discovery protocol routers in an IP network communicate with each other to elect a router which will be responsible for forwarding traffic onto a LAN for a given multicast data source and multicast group pair, for example on the basis of the IP addresses of the routers. In contrast, in embodiments, a compute server designates itself the compute server which will forward traffic onto the data center fabric for a given multicast data source and multicast group pair on the basis of whether the multicast data source is hosted by a virtual machine running on the compute server; this can be viewed as the compute server 'winning an election' to forward data from the multicast data source even though strictly speaking such an 'election' does not involve the same level of intercommunication between the compute servers as in the aforementioned known system election.

Embodiments involve implementing logic in multicast group membership discovery protocol proxies on compute servers in a data center network. If a given proxy receives a multicast group membership discovery protocol report such as an IGMP Report requesting say (S, G) multicast data and the given proxy is hosting S on one of its VMs, the given proxy treats itself as the designated forwarder for that (S, G). The given proxy then forwards a request to the VM (for example over a logical interface connecting the compute server host to the guest VM). Otherwise, the given proxy maintains state for the request, but does not proxy the IGMP Report upstream.

Embodiments comprise enabling multicast group membership discovery protocol snooping (for example IGMP or MLD protocol snooping) on a bridged LAN which forms the hub of a data center network; such embodiments enable optimal forwarding paths over L2 segments.

Some embodiments described above primarily relate to multicast group membership discovery protocols such as IGMP Version 3 (IGMPv3) behavior where data from a specific source is requested by a receiver. For multicast group membership discovery protocols such as IGMP Version 2 (IGMPv2) requests, receivers request group traffic, but sent by any source (for example denoted by (*, G)). Embodiments described above can be made to function in such scenarios by adopting one of several approaches.

According to embodiments, a first such approach involves configuring the multicast group membership discovery protocol proxy nearest to the receiver (which is multicast group membership discovery protocol proxy 202C for receiver 204 in the example embodiments depicted in FIG. 2), with the set of sources which are sending to a given group, and then 'translating' the (*, G) group membership request to a request for (S, G) traffic for each source in that group.

According to embodiments, a second such approach involves configuring a given virtual machine to act as an RP and applying RP point logic such as that described in Request For Comments 4601 (RFC4601) (which is the protocol-independent multicast (PIM) specification). The multicast group membership discovery protocol proxy adjacent to a new multicast source (i.e. the multicast group membership discovery protocol proxy located within the same compute server) can send data (or a single registration request) unicast directly to the RP. According to embodiments, there are several options for the RP. A first option would be for the RP to issue a Report message for (S, G) itself to ensure that the multicast group membership discovery protocol proxy nearest the data source starts to forward data onto the LAN. A second option would be for the RP to forward the data it receives unicast down the multicast trees towards the multicast group membership discovery protocol proxies itself; multicast group membership discovery protocol proxy nodes adjacent to the receiver would then receive that data and could issue a Report for (S, G) traffic at that point.

In embodiments, various entities (for example devices or other apparatus) are described as comprising a processor or processing system, for example as depicted by processors 232B, 202B in FIG. 2. In embodiments, the processing system comprises one or more processors and/or memory. Each device as described in relation to any of the embodiments described above may similarly comprise a processor and/or processing system. One or more of the aspects of the embodiments described herein with reference to the drawings comprise processes performed by devices. In embodiments, a device comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The above embodiments are to be understood as illustrative examples of the present disclosure. Further embodiments are envisaged.

Embodiments described above primarily relate to data center networks. Embodiments may be applied to other types of network, for example any network which contains a single IP path to a specified multicast data source.

Embodiment comprise measures for use in processing multicast group membership discovery protocol messages in an IP network comprising a plurality of servers, where each server in the plurality is capable of hosting one or more multicast data sources. At a multicast group membership discovery protocol proxy located on a server in the plurality, a multicast group membership discovery protocol report message is received which requests delivery of data associated with a specified multicast group from a specified multicast data source. In such embodiments, the network comprises a single IP path to/from the specified multicast data source. The multicast group membership discovery protocol proxy determines whether the specified multicast data source is hosted by the server. In response to a positive determination, the multicast group membership discovery protocol proxy forwards a request corresponding to the received multicast group membership discovery protocol report message to the specified multicast data source on the server. In response to a negative determination, the multicast group membership discovery protocol proxy takes no forwarding action with respect to the received multicast group membership discovery protocol report message.

Embodiment described above primarily relate to processing of multicast group membership discovery protocol messages. Embodiments may also be applied to processing messages relating to multicast protocols in general. Embodiments comprise measures for use in processing multicast protocol messages in a data center network comprising a plurality of compute servers, where each compute server in the plurality is capable of running one or more virtual machines. At a multicast protocol proxy located on a compute server in the plurality, a multicast protocol request message is received which requests delivery of data associated with a specified multicast group from a specified multicast data source. The multicast protocol proxy determines whether the specified multicast data source is hosted by a virtual machine running on the compute server. In response to a positive determination, the multicast protocol proxy forwards a request corresponding to the received multicast protocol request message to the virtual machine hosting the specified multicast data source on the compute server.

Multicast protocols can function without use of embodiments in non-tree networks, for example by employing PIM. However, PIM is not an appropriate choice for data centers, because it requires the compute servers to maintain per-adjacency state; across a data center fabric this will amount to a considerable amount of state. Multicast group membership discovery protocols such as IGMP do not require maintenance of per-adjacency state, which means that multicast group membership discovery protocols such as IGMP are more suitable for use in data centers according to embodiments.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of processing multicast group membership discovery protocol messages in a data center network comprising a plurality of compute servers, each compute server in the plurality being capable of running one or more virtual machines, the method comprising, at a multicast group membership discovery protocol proxy located on a compute server in the plurality:
    receiving a multicast group membership discovery protocol report message requesting delivery of data associated with a specified multicast group from a specified multicast data source, wherein the received multicast group membership discovery protocol report message requests delivery of data associated with the specified multicast group from the specified multicast data source to a receiver application in the data center network;
    determining whether the specified multicast data source is hosted by a virtual machine running on the compute server; and
    in response to a positive determination, forwarding a request corresponding to the received multicast group membership discovery protocol report message to the virtual machine hosting the specified multicast data source on the compute server, wherein the receiver application is located on a different compute server in the plurality to the compute server running the virtual machine which hosts the specified multicast data source.

2. The method of claim 1, comprising in response to the positive determination, designating the multicast group membership discovery protocol proxy to provide a data forwarding role in the data center network in relation to the specified multicast data source and the specified multicast group.

3. The method of claim 1, comprising in response to the positive determination, receiving multicast data from the specified multicast data source; and
    forwarding the received multicast data over the data center network towards one or more receiver applications comprised in the specified multicast group.

4. The method of claim 1, wherein the request is forwarded along a logical interface connecting the compute server to the virtual machine hosting the specified multicast data source.

5. The method of claim 1, comprising, in response to a negative determination, taking no forwarding action with respect to the received multicast group membership discovery protocol report message.

6. The method of claim 1, comprising, in response to a negative determination, maintaining state data associated with the received multicast group membership discovery protocol report message.

7. The method of claim 1, wherein the received multicast group membership discovery protocol report message requests delivery of data associated with the specified multicast group from the specified multicast data source to a virtual machine configured to act as a rendezvous point (RP) in the data center network.

8. The method of claim 1, wherein the specified multicast data source is not hosted by any other virtual machines running on any other compute servers in the plurality.

9. The method of claim 1, wherein the received multicast group membership discovery protocol report message is received from a link local multicast address which enables provision of copies of the multicast group membership discovery protocol report message to multicast group membership discovery protocol proxies located on compute servers in the plurality.

10. The method of claim 1, wherein the data center network comprises a single internet protocol (IP) path to/from the specified multicast data source.

11. The method of claim 1, wherein the multicast group membership discovery protocol proxy is the only multicast group membership discovery protocol proxy connected to the specified multicast data source in the data center network.

12. The method of claim 1, wherein the multicast group membership discovery protocol comprises one or more of the internet group management protocol (IGMP) and the multicast listener discovery (MLD) protocol.

13. The method of claim 1, wherein the multicast group membership discovery protocol proxy comprises one or more of an internet group management protocol (IGMP) proxy and a multicast listener discovery (MLD) protocol proxy.

14. The method of claim 1, wherein the multicast group membership discovery protocol report message comprises one or more of an internet group management protocol (IGMP) report message and a multicast listener discovery (MLD) protocol report message.

15. A system for use in processing multicast group membership discovery protocol messages in a data center network comprising a plurality of compute servers, each compute server in the plurality being capable of running one or more virtual machines, the system comprising at least one memory including computer program code; and at least one processor in data communication with the at least one memory, wherein the at least one processor is configured to, at a multicast group membership discovery protocol proxy located on a compute server in the plurality:

receive a multicast group membership discovery protocol report message requesting delivery of data associated with a specified multicast group from a specified multicast data source, wherein the received multicast group membership discovery protocol report message requests delivery of data associated with the specified multicast group from the specified multicast data source to a receiver application in the data center network;

determine whether the specified multicast data source is hosted by a virtual machine running on the compute server; and in response to a positive determination, forward a request corresponding to the received multicast group membership discovery protocol report message to the virtual machine hosting the specified multicast data source on the compute server, wherein the receiver application is located on a different compute server in the plurality to the compute server running the virtual machine which hosts the specified multicast data source.

16. A non-transitory computer-readable storage medium comprising computer-executable instructions which, when executed by a processor, cause a computing device to perform a method of processing multicast group membership discovery protocol messages in a data center network comprising a plurality of compute servers, each compute server in the plurality being capable of running one or more virtual machines, the method comprising, at a multicast group membership discovery protocol proxy located on a compute server in the plurality:

receiving a multicast group membership discovery protocol report message requesting delivery of data associated with a specified multicast group from a specified multicast data source, wherein the received multicast group membership discovery protocol report message requests delivery of data associated with the specified multicast group from the specified multicast data source to a receiver application in the data center network;

determining whether the specified multicast data source is hosted by a virtual machine running on the compute server; and in response to a positive determination, forwarding a request corresponding to the received multicast group membership discovery protocol report message to the virtual machine hosting the specified multicast data source on the compute server, wherein the receiver application is located on a different compute server in the plurality to the compute server running the virtual machine which hosts the specified multicast data source.

17. A method of processing multicast group membership discovery protocol messages in an IP network comprising a plurality of servers, each server in the plurality being capable of hosting one or more multicast data sources, the method comprising, at a multicast group membership discovery protocol proxy located on a server in the plurality:

receiving a multicast group membership discovery protocol report message requesting delivery of data associated with a specified multicast group from a specified multicast data source, wherein the network comprises a single IP path to/from the specified multicast data source, and wherein the received multicast group membership discovery protocol report message requests delivery of data associated with the specified multicast group from the specified multicast data source to a receiver application in the IP network;

determining whether the specified multicast data source is hosted by the server; and in response to a positive determination, forwarding a request corresponding to the received multicast group membership discovery protocol report message to the specified multicast data source on the server, wherein the receiver application is located on a different server in the plurality to the server which hosts the specified multicast data source.

\* \* \* \* \*